US012724434B2

(12) United States Patent
Jones et al.

(10) Patent No.: US 12,724,434 B2
(45) Date of Patent: Sep. 1, 2026

(54) PROCESS CONTROL FOR A CARBON CAPTURE USE AND STORAGE PIPELINE USING SPECTROSCOPY

(71) Applicant: Halliburton Energy Services, Inc., Houston, TX (US)

(72) Inventors: Christopher Michael Jones, Katy, TX (US); Elena Valerievna Fokina, Aberdeen (GB); Iain J. Shepherd, Aberdeen (GB); Graham Jack, Newburgh (GB)

(73) Assignee: Halliburton Energy Services, Inc., Houston, TX (US)

( * ) Notice: Subject to any disclaimer, the term of this patent is extended or adjusted under 35 U.S.C. 154(b) by 855 days.

(21) Appl. No.: 18/148,824

(22) Filed: Dec. 30, 2022

(65) Prior Publication Data

US 2024/0219935 A1 Jul. 4, 2024

(51) Int. Cl.
*G05D 11/13* (2006.01)
*F16L 58/00* (2006.01)
*G05D 11/00* (2006.01)

(52) U.S. Cl.
CPC ........... *G05D 11/131* (2013.01); *F16L 58/00* (2013.01); *G05D 11/001* (2013.01)

(58) Field of Classification Search
None
See application file for complete search history.

(56) References Cited

U.S. PATENT DOCUMENTS

| | | | |
|---|---|---|---|
| 5,397,989 A | 3/1995 | Spraul et al. | |
| 5,482,063 A | 1/1996 | Miura et al. | |
| 6,343,507 B1 * | 2/2002 | Felling .................... | E21B 49/10 175/5 |
| 6,686,594 B2 | 2/2004 | Ji et al. | |
| 9,797,822 B2 | 10/2017 | Little et al. | |
| 2002/0048818 A1 | 4/2002 | Sakairi et al. | |
| 2017/0248568 A1 | 8/2017 | Yizhack et al. | |
| 2019/0257744 A1 | 8/2019 | Cerrone et al. | |

FOREIGN PATENT DOCUMENTS

| | | |
|---|---|---|
| CN | 207237745 U | 4/2018 |
| CN | 207287048 U | 5/2018 |
| CN | 113784776 A | 12/2021 |
| JP | 2002505421 A | 2/2002 |
| WO | 2006138632 A2 | 12/2006 |

* cited by examiner

*Primary Examiner* — Sean Shechtman
(74) *Attorney, Agent, or Firm* — Kilpatrick Townsend & Stockton LLP

(57) ABSTRACT

Process control for a pipeline can be adjusted based on spectroscopic measurements from a monitoring system. For example, a computing system can receive, from the spectroscopic monitoring system, a spectroscopic measurement with respect to fluid flow in the pipeline. The computing system can determine that an amount of a corrosive component in the fluid flow exceeds a predetermined threshold for the process control. In response to determining that the corrosive component in the fluid flow exceeds the predetermined threshold, the computing system can determine an adjustment to the process control for the fluid flow usable to maintain a compositional stability of the fluid flow. Then, the computing system can output the adjustment to a pipeline tool to maintain the compositional stability of the fluid flow.

20 Claims, 4 Drawing Sheets

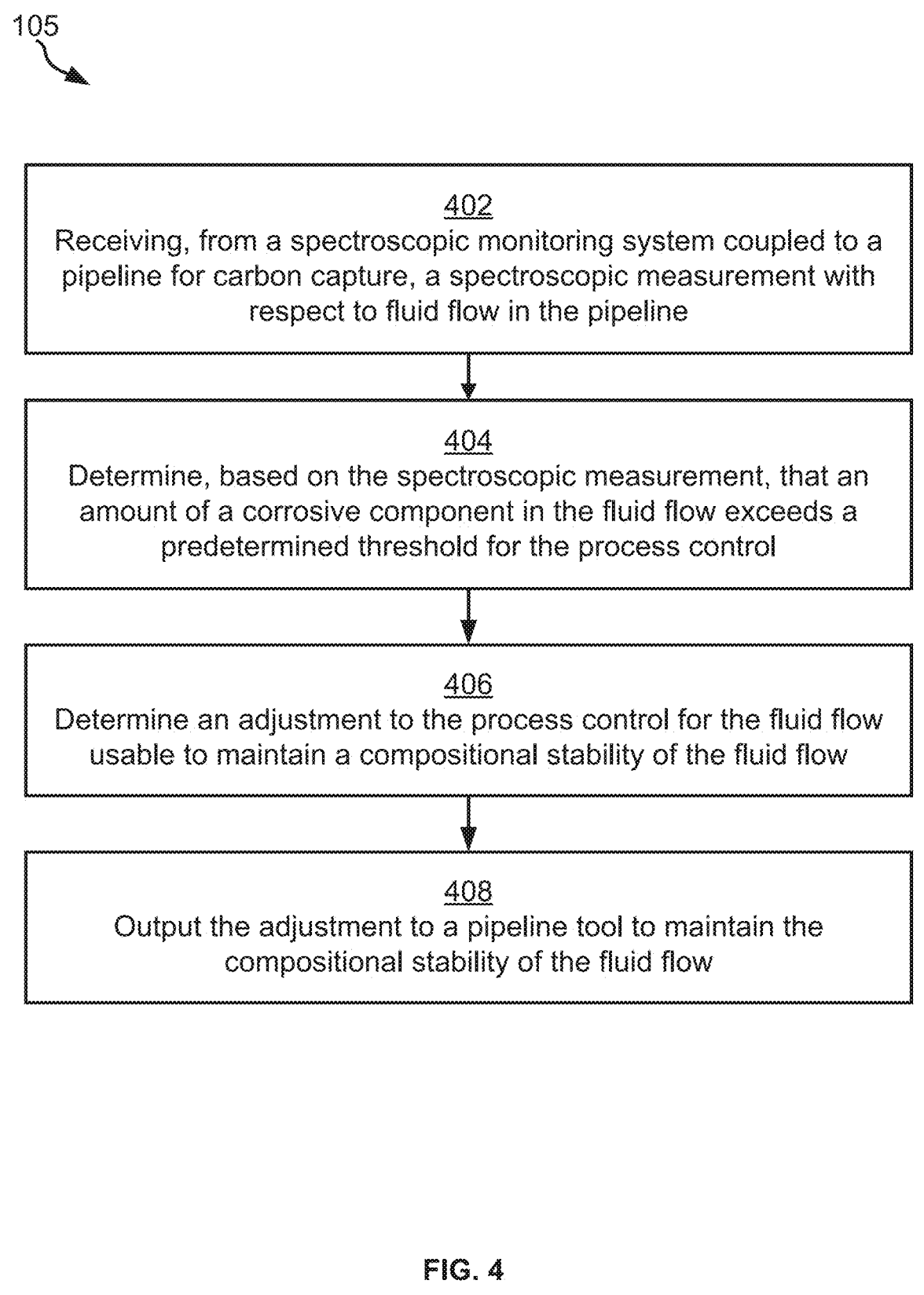

105

402
Receiving, from a spectroscopic monitoring system coupled to a pipeline for carbon capture, a spectroscopic measurement with respect to fluid flow in the pipeline 404
Determine, based on the spectroscopic measurement, that an amount of a corrosive component in the fluid flow exceeds a predetermined threshold for the process control 406
Determine an adjustment to the process control for the fluid flow usable to maintain a compositional stability of the fluid flow 408
Output the adjustment to a pipeline tool to maintain the compositional stability of the fluid flow

FIG. 4

PROCESS CONTROL FOR A CARBON CAPTURE USE AND STORAGE PIPELINE USING SPECTROSCOPY

TECHNICAL FIELD

The present disclosure relates generally to pipeline operations and, more particularly (although not necessarily exclusively), to process control for a carbon capture use and storage (CCUS) pipeline using spectroscopy.

BACKGROUND

Carbon capture use and storage (CCUS) can involve capturing carbon dioxide emissions from industrial processes, such as wellbore operations, and storing the carbon dioxide emissions in subterranean formations. Additionally or alternatively, the carbon dioxide emissions can be captured from the industrial processes and recycled back into the industrial processes. Impurities in gases, such as sulfur dioxide, that are captured with the carbon dioxide emissions can cause corrosion, degradation, or other hazards in CCUS pipelines. Corroded pipes can become brittle and can accumulate cracks that can lead to burst pipes or other hazards.

Optical spectroscopy can be used to identify molecules using an interaction between electromagnetic radiation and the molecules as a function of the wavelength or frequency of the electromagnetic radiation. An optical spectrometer can measure light properties, such as intensity, over a specific portion of an electromagnetic spectrum to identify the molecules.

BRIEF DESCRIPTION OF THE DRAWINGS

FIG. 4 is a flowchart of a process control for a pipeline using spectroscopy according to some examples of the present disclosure.

DETAILED DESCRIPTION

Figure 1:
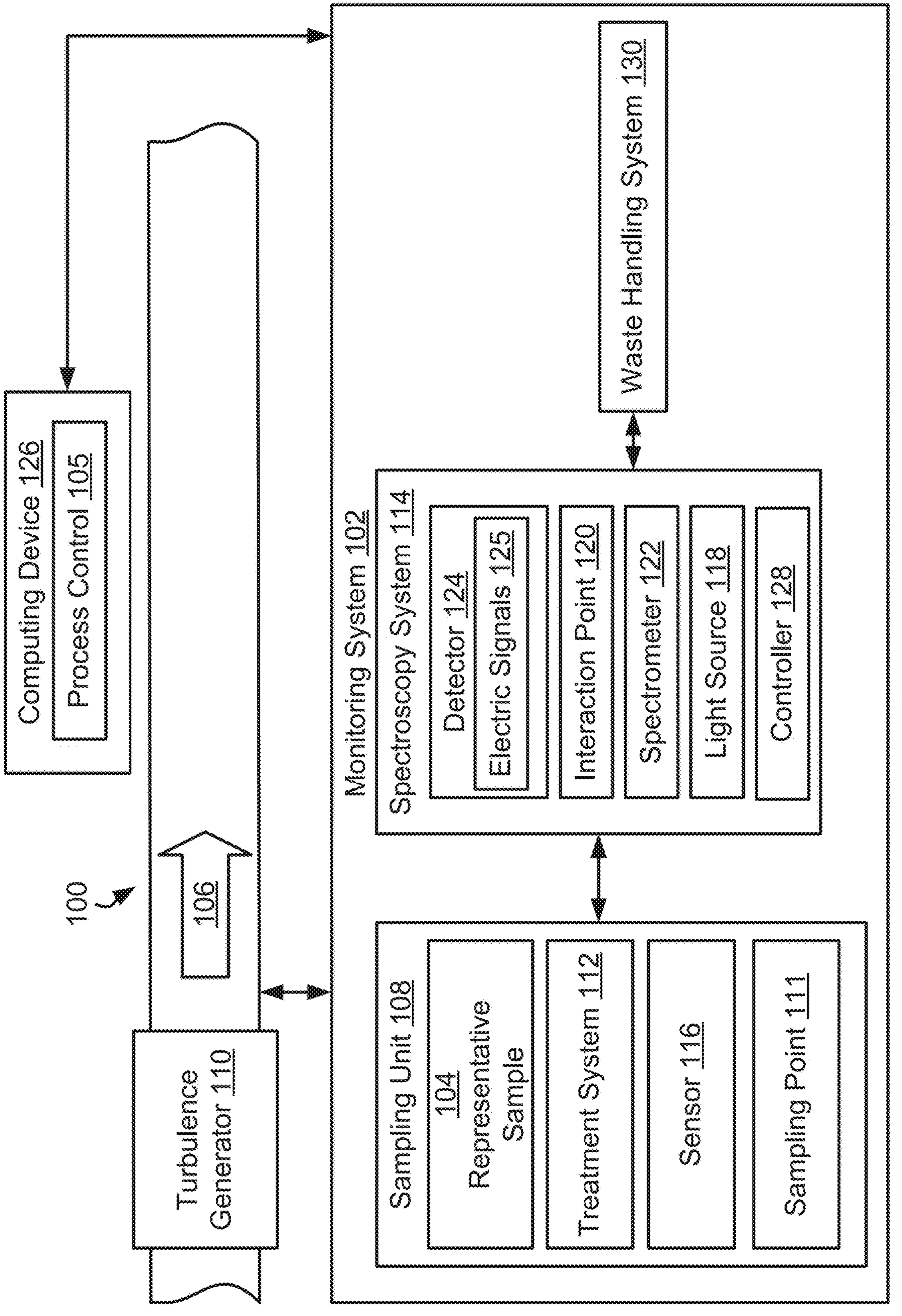
FIG. 1 is a block diagram of a system for process control of a pipeline using spectroscopy according to some examples of the present disclosure.

Certain aspects and examples of the present disclosure relate to a process control that uses spectroscopic measurements from a monitoring system to maintain stability in fluid flow of a pipeline, such as a carbon capture use and storage (CCUS) pipeline. Process control is the act of monitoring and adjusting a process in order to obtain a level of stability, control, or outcome. In pipeline transportation of carbon dioxide, process control can involve monitoring chemical species at specific positions along the CCUS pipeline. Additionally, process control can involve adjustment in response to sudden changes to the chemical composition as detected by the spectroscopic monitoring system. The sudden changes may be indicative of issues in the pipeline. Such issues can include pipeline corrosion or embrittlement (e.g., stress cracking), flow assurance issues, toxicity or other safety issues, or flow allocation changes. Adjustments to the process control can include corrosion condition removal such as removing sources of corrosive potentials (e.g., oxygen or water), scavenging of corrosion components, corrosion inhibitor injection, further inspection, pipeline source reallocation, pipeline shutdown, flow assurance chemical remediation, toxicity alerts and removal, alarms, notifications, further sampling, and the like. Chemical species monitored via spectroscopy can include $CO_2$, $H_2O$, $O_2$, $H_2CO_3$, $CH_4$, $H_2S$, $SO_2$, CO, $H_2$, Hg, As, Se, and trace remediation chemicals including corrosion inhibitors, hydrates inhibitors, and scale inhibitors.

Using the spectroscopic monitoring system can aid in accurate, real-time adjustments for process control of the CCUS pipeline. For example, fluid flow in the CCUS pipeline may include corrosive components such as carbon dioxide, water, hydrocarbons, or other impurities that can cause corrosion or deterioration in the CCUS pipeline. Because the monitoring system includes an onsite spectroscopy system coupled to the CCUS pipeline, excess carbon dioxide or hydrocarbons can be quickly detected. Thus, adjustments for the process control can also be determined and implemented quickly. In this way, the CCUS pipeline can have improved efficiency, reduced corrosion, and minimized risk of release of hazardous materials to the atmosphere during storage or transport.

Additionally, spectroscopic measurements from the monitoring system can be used to perform predictive modeling of fluid flow composition. The process control can also be adjusted based on the predictive modeling. For example, the predictive modeling may predict that certain chemical components will reach hazardous levels in the future. The process control can include predictive modeling when spectroscopic measurements in the CCUS pipeline indicate that certain chemical components are nearing hazardous levels, have achieved concerning levels, or are actively causing issues. The process control can be adjusted to remediate the hazardous chemical components, such as by injecting chemical remediation to neutralize the hazardous chemical components.

In some examples, the process control can include monitoring an individual location or multiple locations in the CCUS pipeline. Monitoring $H_2O$, $O_2$, $SO_4$, $SO_2$, or other oxidizing species can give an indication if corrosion is a concern. High values of oxidizing agents can be indicative of conditions approaching corrosion in the CCUS pipeline. But, a sudden drop in oxidizing conditions may indicate that active corrosion is taking place. Monitoring at least two locations upstream and downstream can isolate the location of potential corrosion. The level of drop between the two locations may indicate the amount of affected surface area. In combination with the time integrated mass of consumed oxidizing agents, a computing device implementing the process control can estimate the level of corrosion taking place. Using pH conditions, composition, other chemical properties, other temperature, pressure, density, or and or other physical properties, and thermodynamic algorithms, kinetic algorithms, or other physics or empirical based algorithms, the corrosive conditions may be predicted, and the severity of an active corrosive system, scaling system, or multiphase conditional system can be assessed. Predictive models can be updated with thermodynamic or kinetic information for the species of interest interaction with the unique alloys of the pipeline or matrix. Examples of the matrix effect can include the presence of an acid species, such as organic acids, which can accelerate the corrosive effects of oxidizing species. Such measurements can be obtained via spectroscopy from the monitoring system, by analogy, or by theory-based derivations. Past measurements of the CCUS pipeline can be analyzed to derive thermodynamic or kinetic values.

In some examples, the process control can involve triggering alarms or warnings to be sent to relevant parties in response to corrosive conditions reaching concerning levels. For example, alarms can be sent to the pipeline operator, the servicing company, the owner of the contents of the CCUS pipeline, governmental agencies, or first responders. The process control can also be adjusted to remediate the corrosive conditions such as diluting the reactants, addition of an inhibitor that makes the CCUS pipeline tolerant to the conditions, removing the reactants by chemical or filtering action, or removing by shutting down the source.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of a system for process control of a pipeline 100 using spectroscopy according to some examples of the present disclosure. The pipeline 100 can be a carbon capture use and storage (CCUS) pipeline. The pipeline 100 can be coupled to a monitoring system 102 that can capture a representative sample 104 from a fluid flow 106 in the pipeline 100 to perform spectroscopic analysis. Additionally, the monitoring system 102 can be coupled to a computing device 126 that can implement process control 105 for the pipeline 100.

In some examples, the components of the fluid flow 106 can separate based on physical properties, such as density, viscosity, or the like. For example, a first component in a first phase with a lower density than a second component in a second phase may move to a bottom portion of the pipeline due to gravity segregation. Additionally or alternatively, a third component in a third phase with a lower viscosity than the second component may move to a central portion of the pipe. Inhomogeneous flow in the pipeline 100 can include multiple phases in the fluid flow 106. For example, the inhomogeneous flow may include two-phase flow, where a liquid phase and a gaseous phase are both present in the fluid flow 106. Additionally or alternatively, the inhomogeneous flow can include at least two immiscible fluids or at least two partially miscible fluids.

Prior to the sampling unit 108 collecting the representative sample 104, a turbulence generator 110 coupled to the pipeline 100 can generate turbulence to mix the fluid flow 106. The turbulence can be generated through a pressure change caused by the turbulence generator 110. The turbulence generator 110 can be positioned upstream from the monitoring system 102 to ensure the sampling unit 108 collects the representative sample 104 after the fluid flow 106 is relatively homogeneous. The turbulence generator 110 can be a non-invasive turbulence generator, an invasive turbulence generator, or a combination thereof.

The representative sample 104 can be collected at a sampling point 111 associated with the sampling unit 108. In some examples, the sampling point 111 can be implemented in combination with the turbulence generator 110, as described below in FIG. 3. In other examples, the sampling point 111 may be positioned external to the sampling unit 108. For example, the sampling point 111 can be positioned within or along an exterior of the pipeline 100. More than one sampling point 111 can be positioned with respect to the exterior of the pipeline 100 to ensure a diversity of locations from which to sample the fluid flow 106. Each fluid sample from each sampling point 111 can be combined to generate the representative sample 104. Alternatively, each fluid sample can analyzed separately, for example by multiple systems associated with monitoring the pipeline 100. As another example, each fluid sample can be analyzed separately, either on a same spectroscopy system or separate analysis systems. A location for each sampling point 111 may be radially adjusted with respect to a flow direction of the fluid flow 106, longitudinally adjusted with respect to the flow direction, or a combination thereof.

After collecting the representative sample 104, a treatment system 112 in the sampling unit 108 can prepare the representative sample 104 for chemical analysis. For example, one or more physical properties of the representative sample 104 can be adjusted to improve a spectroscopic analysis from a spectroscopy system 114. In examples in which the physical properties include temperature, the treatment system 112 can heat the representative sample 104 to flash the representative sample 104. Flashing the representative sample 104 can change it from a liquid state to a vapor state. In some examples, the representative sample 104 may be analyzed in the liquid state. Compared to the liquid state, the vapor (gas) state can provide less sample matrix effects for analysis. A total pressure associated with the representative sample 104 may be above atmospheric pressure or below atmospheric pressure including relatively low pressure such as milli-torr or micro-torr. The sampling unit 108 can include at least one sensor 116 to detect the physical properties of the representative sample 104. In some examples, the sensor 116 can be coupled to the sampling point 111. Additional examples of adjustments to the representative sample 104 can include diluting the representative sample 104, separating the representative sample 104 into separate components, or other suitable methods associated with preparing the representative sample 104 for analysis.

The sampling unit 108 can transport the representative sample 104 to the spectroscopy system 114 in the monitoring system 102. The spectroscopy system 114 can chemically analyze the representative sample 104. The spectroscopy system 114 can include a light source 118 to generate a light signal that perturbates the representative sample 104. An interaction point 120 can be positioned in the spectroscopy system 114 to adjust a pathlength for the light signal. Adjusting the pathlength for the light signal may affect collimation of the light signal. A spectrometer 122 in the spectroscopy system 114 may adjust a light property of the light signal. Examples of the light property can include wavelength, intensity, frequency, or the like. In some examples, the spectrometer 122 can adjust the light property without affecting the collimation of the light signal.

After the light signal perturbates the representative sample 104, a detector 124 in the spectroscopy system 114 can receive the light signal and can convert the light signal into electric signals 125. The detector 124, interaction point 120, spectrometer 122, and perturbation source (e.g., the light source 118) may be combined in any suitable combination and placed in any order. The electric signals 125 can be transmitted to the computing device 126 that is communicatively coupled with the monitoring system 102. The computing device 126 can interpret the electric signals 125 to obtain spectroscopic measurements of the representative sample 104. In some examples, the electric signals 125 can be outputted to a converter that converts the electric signals

125 from analog signals to digital signals. The computing device 126 may generate a plot of a spectrum associated with the representative sample 104 using the electric signals 125 received from the detector 124. As described herein, the plot does not mean to imply a limiting graphical representation, whether electronic or not. Additionally or alternatively, the computing device 126 can generate an equivalent array, matrix, mathematical representation, or digital representation of the spectrum. The plot of the spectrum can include an absolute scale or a relative scale for the spectrum. In response to receiving the electrical signals 125, the computing device 126 can determine an adjustment to a process control 105 for the pipeline 100. For example, to maintain stability levels in the pipeline 100, the computing device 126 can generate an adjustment for one or more components, such as the spectroscopy system, of the monitoring system 102. In some instances, the adjustment can be applied to implement remediation in the pipeline 100. In other examples, the adjustment can cause the treatment system 112 of the sampling unit 108 to adjust the physical properties of the representative sample 104.

In some examples, the computing device 126 may detect degradation of the pipeline 100 based on the electrical signals 125. The degradation of the pipeline 100 can result from corrosion caused by corrosive components in the fluid flow 106. The corrosion can lead to fractures, weak points, or the like in the pipeline 100 that may worsen to result in bursting of the pipeline or leakage of the fluid flow. By detecting corrosive components the fluid flow 106 with the monitoring system 102 via spectroscopy, remediation can be initiated to minimize degradation of the pipeline 100 caused by the components in the fluid flow 106. For example, the computing device 126 can determine adjustments to the process control 105 such as injecting remediation chemicals, such as corrosion inhibitors, hydrates inhibitors, scale inhibitors, or the like into the fluid flow. The computing device 126 can output the adjustment to the process control 105 to a pipeline tool, such as the waste handling system 130, to cause the adjustment to be performed. In some examples, the computing device 126 can perform real-time monitoring such that the remediation can be implemented relatively quickly after detecting that a concentration for the one or more corrosive components exceeds a predetermined threshold.

After being chemically analyzed by the spectroscopy system 114, the representative sample 104 can be transported to a waste handling system 130 in the monitoring system 102. The waste handling system 130 may be located onsite with the sampling unit 108 and the spectroscopy system 114. The representative sample 104 can be combined with other chemical compounds used in the monitoring system 102 to form chemical waste. In some examples, the waste handling system 130 can remediate the chemical waste before disposing the chemical waste. Additionally, the waste handling system 130 can separate hazardous compounds in the chemical waste from benign compounds before remediating the chemical waste. The hazardous compounds can be neutralized, while the benign compounds may be released to a surrounding environment, such as atmosphere. Additionally or alternatively, the benign compounds can be captured or recycled by other means.

Figure 2:
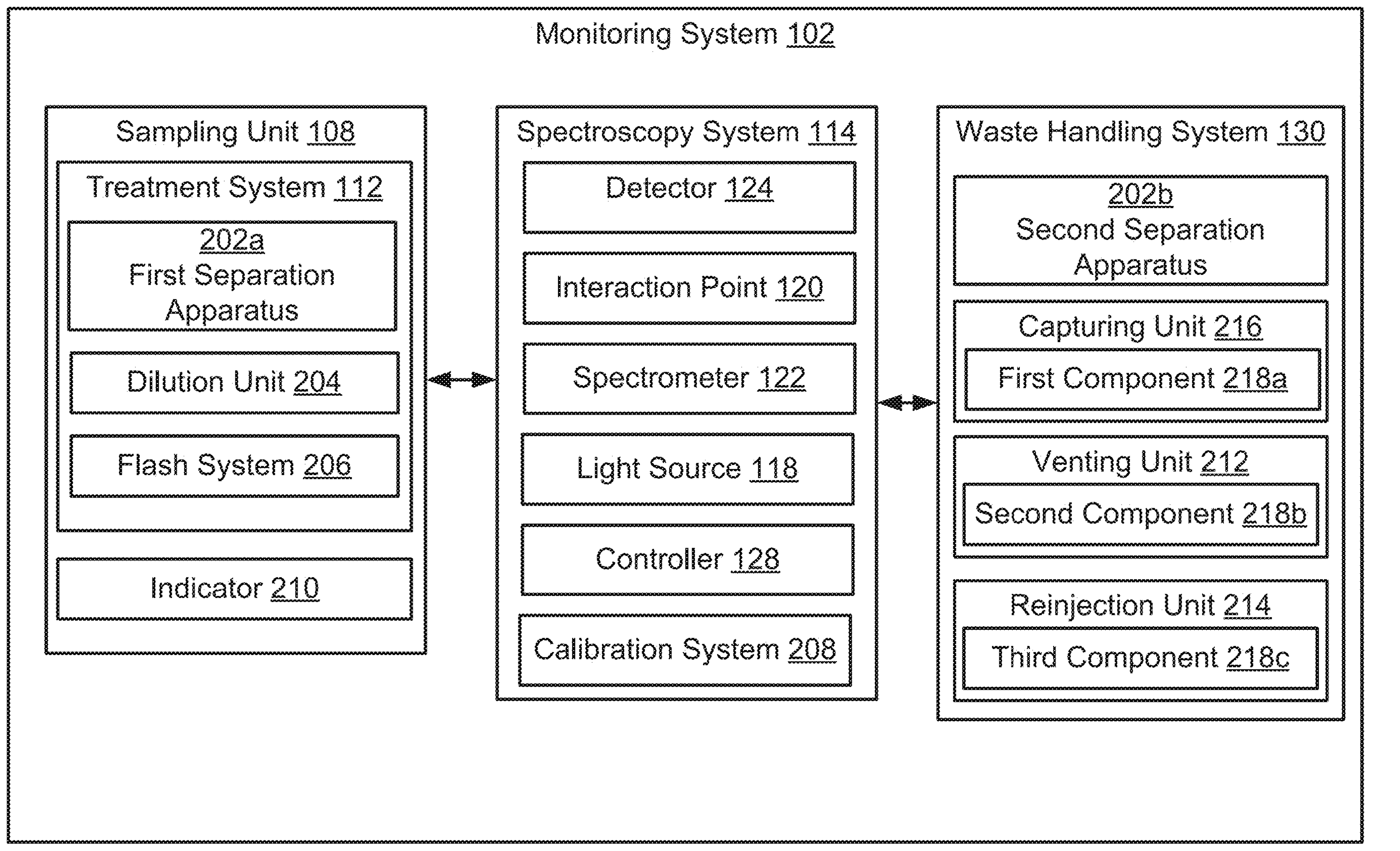
FIG. 2 is block diagram of a computing device for process control of a pipeline using spectroscopy according to some examples of the present disclosure.

FIG. 2 is a block diagram of the monitoring system 102 for a pipeline (e.g., the pipeline 100 of FIG. 1) according to some examples of the present disclosure. A fluid flow (e.g., the fluid flow 106 of FIG. 1) can include one or more chemical compounds in liquid phase or gas phase. Components of the monitoring system 102 can include the sampling unit 108, the spectroscopy system 114, and the waste handling system 130. The representative sample 104 can be collected by the sampling unit 108 using a sampling point. The sampling unit 108 can include a treatment system 112 that prepares the representative sample 104 before the spectroscopy system 114 chemically analyzes the representative sample 104. The treatment system 112 can prepare the representative sample 104 by adjusting a physical property of the representative sample 104.

In some examples, the treatment system 112 can include a first separation apparatus 202 that separates the representative sample into components. The first separation apparatus 202 can separate the representative sample prior to the representative sample entering the treatment system 112. Additionally or alternatively, the first separation apparatus 202 can separate the representative sample prior to the representative sample being received by the spectroscopy system 114. The first separation apparatus 202 may apply at least one separation method to separate the representative sample into the components. Examples of the separation method can include adsorption, which involves an adhesion of particles to a surface. Specifically, separating the representative sample using adsorption can be implemented through using differential adsorption onto a filter substrate or an extended path. Examples of the filter substrate can include activated carbon, zeolite, or other suitable adsorbents. The extended path may be accomplished by tubing, a microfluidic device, or a tortuous path. Components of the representative sample that are captured by the filter substrate can be released by an activation mechanism, such as heating the filter substrate or path material of the extended path.

Additionally, the separation method can include using cryogenic means to separate the representative sample into the components. The cryogenic means can include lowering a temperature for the representative sample below a freezing point for at least one component in the representative sample. For example, water may be an interferent for hydrogen sulfide and can be removed cryogenically through freezing the water at a first temperature. The temperature can be at or below 0° C. (32° F.) such that the hydrogen sulfide remains in a vapor phase.

Additionally or alternatively, the treatment system 112 can include a dilution unit 204. Adjusting concentration of the components in the representative sample can provide increased sensitivity to an analyte. In some examples, the dilution unit 204 can remove interfering components from the representative sample. For example, water can be an interferent with respect to detecting hydrogen sulfide. By removing the water from the representative sample, the dilution unit 204 can generate a more concentrated representative sample. The spectroscopy system 114 can better analyze the more concentrated representative sample for hydrogen sulfide compared to the representative sample. The representative sample may also be analyzed using a difference between an upstream concentration and a downstream concentration with respect to a retaining material. Additionally or alternatively, the representative sample may be analyzed while temporarily retained by the retaining material and then released.

The dilution unit 204 can adjust a concentration for the components of the representative sample individually or batchwise. Diluting the representative sample can involve adding the representative sample to a container of inert gas, such as helium, nitrogen, or the like. Additionally or alternatively, the representative sample can be diluted using air, which typically includes nitrogen and oxygen. In some examples, a generator, such as a nitrogen generator or a hydrogen generator, can be used to dilute the representative sample. In some examples, varying dilutions may provide suitable analysis for different components in the representative sample.

The treatment system 112 additionally or alternatively can include a flash system 206. Sample analysis can be more sensitive or selective when the representative sample is in the gas phase. A flash system may, in some examples, be used to break down, decompose, or break apart molecules to yield analyzable products. Such a flash system may include oxygen or other suitable reagents to convert the analyte into a relatively more analyzable form. In some examples, the fluid flow can already be in the gas phase, whereas in other examples, the fluid flow can be in the liquid phase. A combination of gas and liquid as two-phase flow can occur in the fluid flow as well. The flash system 206 can convert the representative sample from a liquid phase to a gas phase by reducing pressure. For example, the flash system 206 can expand relatively small amounts of the representative sample in the liquid phase into relatively low pressure. The relatively low pressure may be near atmospheric pressure compared to pressure in the pipeline. In some examples, the relatively low pressure may be much lower than atmospheric pressure and below pipeline pressure. Alternatively, the flash system 206 can expand the representative sample into vacuum pressure, which is lower than atmospheric pressure. Additionally or alternatively, the flash system 206 may contain a heated section to convert the representative sample from the liquid phase to the gas phase.

To analyze the representative sample, the spectroscopy system 114 can use optical spectroscopy, mass spectroscopy, chromatography, electromagnetic analysis, nuclear magnetic resonance (NMR) analysis, X-ray analysis, acoustic analysis, ultrasonic analysis, or a combination thereof. Analyzing the representative sample can involve an interaction point 120, a perturbation technique, and a detection technique. In non-optical spectroscopic systems, using perturbation detection can still be applicable. For example, the representative sample may be perturbed by ion fragmentation and subsequent magnetic flux as in mass spectroscopy, followed by a current detection. Additionally or alternatively, the representative sample may be perturbed by interaction with a stationary phase followed by thermal conductivity detection or flame ionization detection. A spectrum generated by any such perturbation technique can provide a measurement of a magnitude of a perturbation effect on the representative sample as a function of changing properties of the perturbation technique. This may be a measurement of the absorbance of light from the light source 118 as a function of a wavelength of the light.

In some examples, the spectroscopy system 114 may experience changes in system behavior over time, which can be referred to as drift. A calibration system 208 in the spectroscopy system 114 can be used to detect drift. Drift in the spectroscopy system 114 can cause inaccurate readings, decrease measurement reproducibility, decrease sensor sensitivity, or a combination thereof. A level of the drift in the spectroscopy system 114 can be checked using a reference check, which may include a standard or a blank. In some examples, the reference check can be conducted after detecting that operational parameters for the spectroscopy system 114 have exceeded a predefined threshold, such as a predefined tolerance. For example, the operational parameters may have drifted beyond the predefined tolerance for a voltage, a current, a temperature, or the like. The predefined threshold additionally or alternatively may be associated with an expected range for a spectroscopic analysis. For example, exceeding the expected range may involve more than one hundred percent total analyte detection. Alternatively, the drift in the spectroscopy system 114 may be detected due to the operational parameters being outside the predefined threshold.

After detecting drift, the calibration system 208 can calibrate the spectroscopy system 114 through empirical methods, statistical methods, or physics-based methods. Calibrating the spectroscopy system 114 can involve optical path adjustment or spectrometer adjustment. Additionally or alternatively, calibrating the spectroscopy system 114 can involve replacing one or more components in the spectroscopy system 114, such as a light source 118, a detector 124, or another suitable component.

In examples in which the spectroscopy system 114 uses optical spectroscopy, the interaction point 120 can be an optical cell. The perturbation technique can be optical absorbance from the light source 118, while the detection technique can be intensity detection as a function of wavelength. Other perturbation techniques may be scattering, fluorescence, or other suitable techniques to change the energy state(s) of the representative sample under analysis. The representative sample can be referred to as an analyte. Although the monitoring system is described as implementing absorbance as the perturbation technique, other suitable perturbation techniques may be substituted for absorbance. The light source 118 can output a light signal to perturbate the representative sample. More generally, the light source 118 can represent a sample perturbation source. In some examples, the light source 118 can adjust a power of the light signal to avoid saturating the detector 124 with respect to an optical density of the representative sample. The optical cell can adjust a pathlength for the light signal to tune the light signal by changing an angle through the optical cell. Additionally or alternatively, the pathlength of the light signal can be adjusted by changing a window position or mirror position in the optical cell or changing a number of internal reflections in the optical cell. Adjusting the pathlength can affect the light signal nonlinearly as a function of adsorption.

An indicator 210, such as a coulometric indicator, can be injected into the pipeline or into the sampling unit 108. In some examples, the indicator 210 may be a reversible indicator. The reversible indicator can be bound to a substrate, such as a window, in the interaction point 120. The indicator 210 can adjust physical properties, such as optical response or concentration as a function of pipeline condition, of the representative sample 104. Additionally, the indicator 210 may show a presence of specific analytes or physical conditions, such as temperature, pressure, corrosion potential, active corrosion, or the like, associated with the fluid flow. For example, the indicator 210 can indicate the presence of active corrosion through a molecule that adsorbs to a metal oxide. The molecule can be reduced in concentration because of the metal oxide being present in the pipeline, thereby indicating the presence of active corrosion.

An additional example can include the indicator 210 changing its wavelength of absorption after contacting an acid. In this example, the indicator 210 can function as a pH indicator. In other examples, the indicator 210 may indicate a presence of a specific analyte. For example, a yellow hue of gold can be reduced as mercury adsorbs. Additionally or alternatively, florescence quenching can be implemented by the indicator 210 such that the indicator 210 quenches the florescence of a specific component in the representative sample. A reference fluorescent measurement may be made with the indicator 210. Alternatively, the reference fluorescent measurement can be implemented while the indicator 210 is absent from the fluid flow or representative sample 104. In some examples, the indicator 210 may further be bonded or contained within an immobile permeable substrate in order to retain the indicator 210 for more than one use. Such an immobile substrate would, for instance, be located within an interaction path of the spectroscopy system 114.

A spectrometer 122 in the spectroscopy system 114 can adjust at least one light property, such as intensity, wavelength, or the like, that is associated with the light signal before the light signal perturbates the representative sample. Generally, the spectrometer 122 can represent a means of measuring a magnitude of an effect of a perturbation as a function of a change of a perturbation property. For example, the spectrometer 122 can modulate the wavelength of the light signal to provide relatively clearer analyte signal and to reduce analytical impedance. The analytical impedance, such as particulates, an interferent, or the like, can be removed from the representative sample using the first separation apparatus 202*a*. After the light signal perturbates the representative sample, a detector 124 in the spectroscopy system 114 can receive the light signal and can convert the light signal into electric signals (e.g., the electric signals 125 of FIG. 1). The electric signals may be transmitted to a computing device (e.g., the computing device 126 of FIG. 1). Additionally or alternatively, the electric signals can be transmitted to a controller 128 that can be positioned in the spectroscopy system 114 or another location in the monitoring system 102. In some examples, the detector 124 can be tuned for wavelength sensitivity or wavelength amplification based on the light source 118.

The controller 128 can implement feedback control between the detector 124, the spectrometer 122, the light source 118, or a combination thereof. The feedback control can be associated with an optimization criterion. Examples of the optimization criteria can include dynamically adjusted sensitivity with respect to components of the representative sample, net analyte signal, signal-to-noise ratio, or the like. In some examples, the controller 128 may be communicatively coupled to the sampling unit 108. For example, the controller 128 can be communicatively coupled to the treatment system 112 to use the feedback control to adjust the physical property of the representative sample. As another example, turbulence or sampling homogeneity obtained by the sampling unit 108 may be monitored as feedback for the controller 128. Homogeneity of the representative sample may, for instance be analyzed by a time variation of any suitable analyte measurement obtained by the sampling unit 108. The turbulence in the pipeline may be directly measured including, but not limited to, based on pressure differential as a function of distance in the pipeline. In some examples, dynamic turbulence generators may also be controlled by feedback via direct turbulence measurements or homogeneity of the representative sample.

The monitoring system 102 can include the waste handling system 130 for removing the representative sample from the spectroscopy system 114. The representative sample can be referred to as a waste sample after being chemically analyzed. In some examples, the waste handling system 130 may treat the waste sample in order to remove a portion of the waste sample. For example, the waste handling system 130 may remove toxic portions of the waste sample, environmentally sensitive portions of the waste sample, or elements of the waste sample to make the waste sample safer to store, transport, or handle. The waste handling system 130 can handle the waste sample in accordance with regional laws or regulations. Additionally, the waste handling system 130 can remove chemical consumables, such as the indicator 210, preparation reagents, or the like, that are used in the monitoring system 102. Additional examples of the chemical consumables can include matrix normalization components, such as nitrogen, argon, helium, or the like. Chemical waste can include the representative sample, the chemical consumables, or a combination thereof. Methods for handling the chemical waste can include reinjecting the chemical waste into the fluid flow via a reinjection unit 214, venting the chemical waste to atmosphere via a venting unit 212, storing the chemical waste via a capturing unit 216, or the like. The waste handling system 130 may recycle in part at least a portion of the chemical waste in order to reinject the portion of the chemical waste into the pipeline stream or use separated components of the chemical waste for further analysis. The waste handling system 130 can perform such adjustments in response to signals received from the computing device 126 of FIG. 1.

For example, the computing device 126 can cause venting unit 212 in the waste handling system 130 to flare the chemical waste, such as using an open flame. After flaring, the venting unit 412 can vent the chemical waste to the atmosphere. In another example, the computing device 126 may cause the reinjection unit 214 to reinject the chemical waste into the fluid flow. The reinjection unit 214 may include a treatment process to adjust one or more physical properties of the chemical waste to match a fluid flow condition with respect to the fluid flow in the pipeline. For example, the flash system 206 may lower the pressure of the representative sample to change the representative sample from the liquid phase to the gas phase. Prior to reinjecting the chemical into the fluid flow, a treatment processor can increase the pressure of the chemical waste to match or exceed a pressure of the fluid flow. Additionally, the computing device 126 can cause the waste handling system 130 to collect the chemical waste using a capturing unit 216 to obtain a sufficient volume of the chemical waste prior to reinjecting the chemical waste.

The waste handling system 130 additionally can separate the chemical waste into individual components to simplify handling or transportation of the chemical waste. For example, the chemical waste can be separated into a first component 218*a*, a second component 218*b*, and a third component 218*c*. The first component 218*a* can be optionally pumped into a waste container, such as a tank, by the capturing unit 216 for storage prior to waste disposal. The second component 218*b* may optionally be emitted to the atmosphere after being determined to be safe to vent. The third component 218*c* may be optionally injected into the fluid flow by the reinjection unit 214 after the reinjection unit 214 adjusts the physical property of the third component 218*c* to match the fluid flow condition. The first component 418*a*, the second component 418*b*, and the third component 418*c* may be treated in any suitable combination thereof.

Additionally or alternatively, the individual components can be categorized by the computing device 126 as a hazardous component or as a benign component. The hazardous component may be a chemical compound that is hazardous to human health (i.e., toxic), harmful to ecosystems, or has regulations pertaining to environmental release. Examples of the hazardous component can include carcinogens, teratogens, or other suitable chemicals that can endanger human health. The benign component may be relatively safe to release to the atmosphere or to a surrounding environment.

A second separation apparatus 202*b* can be included in the waste handling system 130 to separate the chemical waste into the individual components. Separation methods implemented by the first separation apparatus 202*a* can be used by the second separation apparatus 202*b* and vice versa. In some examples, the second separation apparatus 202*b* can involve reactive filtering. For example, carbon dioxide can be removed from the chemical waste by reactive filtering with barium oxide, calcium oxide, or another suitable metal oxide or reactive material. By separating the chemical waste into the individual components, the hazardous component can be handled separately from the benign component. For example, the hazardous component can be captured, while the benign component may be vented to the surrounding environment, reinjected into the fluid flow, or captured separately from the hazardous component.

Prior to capturing or releasing the hazardous component, the waste handling system 130 may neutralize the hazardous component. For example, the waste handling system 130 can injection oxygen over a catalyst to neutralize combustible components. Additionally, the catalyst, such copper oxide or other suitable metal oxides, may be regenerated in situ. Alternatively, the waste handling system 130 may treat the hazardous component with an oxidant, such as ozone. Additives, such as plasma, arcs, or heat, can be implemented by the waste handling system 130 in conjunction with the oxidant for reactive neutralization. Alternatively, the waste handling system 130 can directly implement the additives with respect to the hazardous component.

After being separated from the chemical waste, the hazardous component can be captured using the capturing unit 216 for storage locally. Additionally or alternatively, the hazardous component can be stored temporarily before transportation for waste disposal. An interlocking system can be implemented in the waste handling system 130 to store the chemical waste. In some examples, the hazardous component can be stored as a gas in a pressurized container. Alternatively, the hazardous component can be stored by trapping the hazardous component in a fluid medium. The fluid medium can be inert with respect to the hazardous component and can enable a lower likelihood of explosion compared to storing the hazardous component in the pressurized container.

A disposal assay can be determined by analyzing the representative sample. The disposal assay can indicate one or more steps associated with the waste disposal. For example, the disposal assay may trigger alarms at a worksite related to the pipeline. Additionally or alternatively, the disposal assay can trigger a remote notification for informing an operator regarding precautions to implement prior to arriving at the worksite or prior to the waste disposal. A list of HSE (health, safety, and environmental) concerns may be transmitted based on analyzing the representative sample.

Figure 3:
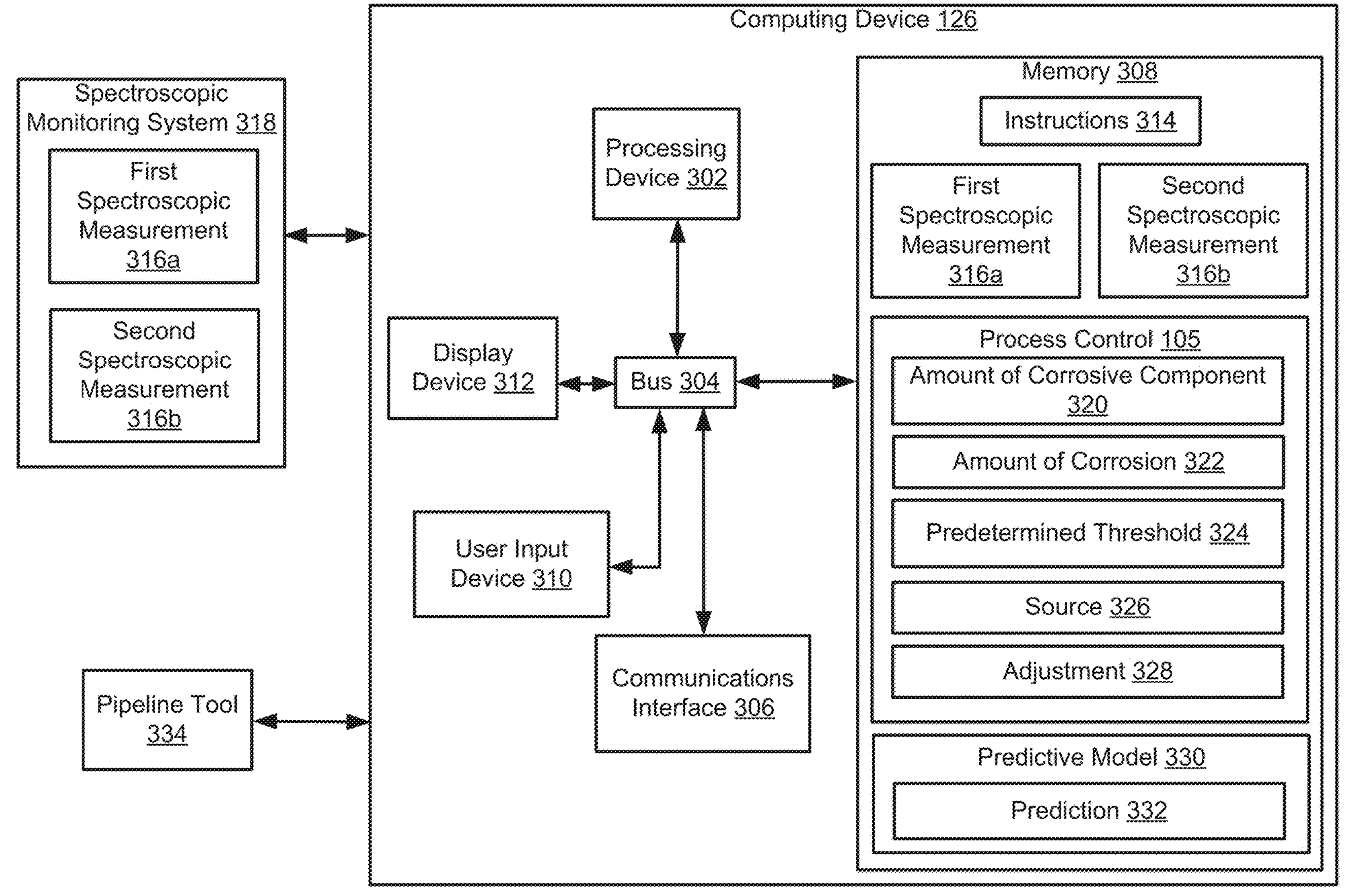
FIG. 3 is a block diagram of a monitoring system for a pipeline according to some examples of the present disclosure.

FIG. 3 is block diagram of a computing device 126 for process control of a pipeline using spectroscopy according to some examples of the present disclosure. The computing device 126 includes a processing device 302, a bus 304, a communication interface 306, a memory 308, a user input device 310, and a display device 312. In some examples, some or all components shown in FIG. 3 can be integrated into a single structure, such as a single housing. In other examples, some or all of the components shown in FIG. 3 can be distributed (e.g., in separate housings) and in communication with each other. The processing device 302 can execute one or more operations to implement process control 105 for the CCUS pipeline 100 depicted in FIG. 1. The processing device 302 can execute instructions 314 stored in the memory 308 to perform the operations. The processing device 302 can include one processing device or multiple processing devices. Non-limiting examples of the processing device 302 include a field-programmable gate array (FPGA), an application-specific integrated circuit (ASIC), a processor, a microprocessing device, etc.

The processing device 302 depicted in FIG. 3 is communicatively coupled to the memory 308 via the bus 304. The non-transitory memory 308 may include any type of memory device that retains stored information when powered off. Non-limiting examples of the memory 308 include electrically erasable and programmable read-only memory (EEPROM), flash memory, or any other type of non-volatile memory. In some examples, at least some of the memory 308 can include a non-transitory computer-readable medium from which the processing device 302 can read instructions 314. A computer-readable medium can include electronic, optical, magnetic, or other storage devices capable of providing the processing device 302 with computer-readable instructions or other program code. Non-limiting examples of a computer-readable medium include (but are not limited to) magnetic disk(s), memory chip(s), read-only memory (ROM), random access memory (RAM), an ASIC, a configured processing device, optical storage, or any other medium from which a computer processing device can read instructions 314. The instructions 314 can include processing device-specific instructions generated by a compiler or an interpreter from code written in any suitable computer-programming language, including, for example, C, C++, C#, etc.

In some examples, the computing device 126 includes a communication interface 306. The communication interface 306 can represent one or more components that facilitate a network connection or otherwise facilitate communication between electronic devices. Examples include, but are not limited to, wired interfaces such as Ethernet, USB, IEEE 1394, or wireless interfaces such as IEEE 802.11, Bluetooth, near-field communication (NFC) interfaces, RFID interfaces, or radio interfaces for accessing cellular telephone networks (e.g., transceiver/antenna for accessing a CDMA, GSM, UMTS, or other mobile communications network).

In some examples, the computing device 126 includes a user input device 310. The user input device 310 can represent one or more components used to input data or adjust the process control 105. Examples of the user input device 310 can include a keyboard, mouse, touchpad, button, or touch-screen display. In some examples, the computing device 126 includes a display device 312. Examples of the display device 312 can include a liquid-crystal display (LCD), a television, a computer monitor, or a touch-screen display. In some examples, the user input device 310 and the display device 312 can be a single device, such as a touch-screen display.

The computing device 126 can receive spectroscopic measurements 316*a-b* from a spectroscopic monitoring system 318 (e.g., the monitoring system 102 of FIG. 1) coupled to the pipeline 100. The spectroscopic measurements 316*a-b* can be the electrical signals 125 of FIG. 1. The memory 308 can include a process control 105 for the pipeline 100 that maintains a level of compositional stability for fluid flow in the pipeline 100. The processing device 302 can analyze the spectroscopic measurements 316*a-b* to determine adjustments to the process control 105 to maintain the compositional stability.

For example, $CO_2$ in transportation pipelines can contain impurities. Depending on their physical and chemical nature, such impurities can induce diverse phase equilibria such as undesirable liquid phases when the pipeline 100 operates in a low pressure single gas phase mode. The liquid phases can appear at normal operating temperatures and can lead to corrosion mechanisms. Carbon steel is a typical material used for $CO_2$ transportation pipelines. $CO_2$ dissolves in water to form carbonic acid, which is corrosive to carbon steel. The rate of corrosion can depend on the formation and stability of iron carbonate that is formed as a consequence of corrosion of carbon steel in carbonic solution. If an aqueous phase is formed, a number of competing corrosion mechanisms can be foreseen depending on the type of impurities that are dissolved in the water phase and the type of cross-chemical reactions (e.g., bulk phase reactions) taking place. An aqueous phase containing elemental sulfur, sulfuric acid, and nitric acid in addition to $O_2$ and $H_2S$ can form when the $CO_2$ stream contains water, $NO_2$, $SO_2$, $H_2S$, and $O_2$ within certain limits. In order to monitor, control, mitigate, and predict corrosion formation, the processing device 302 can determine the concentration of certain corrosive components in the fluid flow based on the spectroscopic measurements 316*a-b*.

The processing device 302 can analyze the spectroscopic measurements 316*a-b* to detect an amount of a corrosive component 320 that exceeds a predetermined threshold 324. The memory 308 may store different predetermined thresholds 324 for different components. Examples of predetermined thresholds 324 can include a 500 ppm threshold for $H_2O$, a 200 ppm threshold for $H_2S$, a 2000 ppm threshold for CO, a 4 vol. % threshold for $CH_4$ in aquifer or 2 vol. % threshold in EOR, a 4 vol. % threshold for $N_2$, a 4 vol. % threshold for Ar, a 4 vol. % threshold for $H_2$, and a 95.5% concentration of $CO_2$. Corrosive components exceeding their predetermined threshold 324 can cause issues in the pipeline 100. For example, the presence of water in a $CO_2$ fluid flow can cause a multitude of problems if the concentration is high enough. The water can interact with other impurities in the $CO_2$ fluid flow if present in sufficient levels, which can lead to chemical reactions or accelerated corrosion and cracking of the pipeline 100.

Unreacted hydrogen is a by-product of pre-combustion carbon dioxide capture and can be a potential source of impurities. Hazards associated with hydrogen as an impurity can include hydrogen stress cracking (HSC), stress-oriented $H_2$-induced cracking (SOHIC), and $H_2$ embrittlement. HSC can result from the presence of $H_2$ in a metal together with tensile stress. HSC can describe cracking in metals that are not sensitive to sulfide stress cracking, but which can be embrittled by $H_2$ when galvanically coupled, as the cathode, to another metal that is acting as an anode. SOHIC is the presence of staggered small cracked formed approximately perpendicular to the principal stress (residual or applied) resulting in a ladder-like crack array linking (sometimes small) pre-existing HIC cracks. $H_2$ embrittlement is the process by which a high-strength steel can become brittle and fracture following $H_2$ exposure. But, providing the hardness levels in the pipeline 100 are kept below specified levels, $H_2$ embrittlement can be avoided. For example, the hardness level can be kept below 300 HV10, unless the system is in "sour service" and can be kept below 230 HV10.

$H_2S$ is a product of the reaction of sulphur in a feedstock (e.g., coal, refinery bottoms, or sulphur-containing natural gas) with hydrogen in the absence of oxygen. Technologies such as gasification and autothermal reformation provide this reducing atmosphere. Hazards associated with $H_2S$ as an impurity in the pipeline 100 include sulfide stress cracking (SSC) and stress corrosion cracking (SCC). SSC is the cracking of metal involving corrosion and tensile stress (residual or applied) in the presence of water and $H_2S$. SCC is the cracking of metal involving anodic processes of localized corrosion and tensile stress (residual or applied) in the presence of water and $H_2S$. Factors other than mechanical properties known to affect the susceptibility of metallic materials to cracking in $H_2S$ service include the $H_2S$ partial pressure, the in-situ pH, the concentration of dissolved chloride or other halides, the presence of elemental sulphur or other oxidants, temperature, galvanic effects, mechanical stress, and length of time after exposure to contact with a liquid water phase.

Presence of corrosive components can cause flow assurance issues. Primary flow assurance issues include but are not limited to inorganic scale ($BaSO_4$, $CaCO_2$, FeS), organic scale (asphaltenes, wax, napthanoid complexes), viscosifying conditions (emulsions, gelling, fluid incompatibility), hydrates formation, sanding and bridging, corrosion, and stress cracking. Such conditions may be pressure, temperature, and compositional based. Some chemical components promote the stable solution of asphaltenes, whereas other conditions destabilize asphaltenes in solutions.

In some examples, the processing device 302 can determine an amount of corrosion 322 of the pipeline 100 based on the spectroscopic measurements 316*a-b*. For example, the processing device 302 can detect stress cracking based on chemical conditions, including the presence of hydrogen generating species, such as hydrogen sulphide and other sulphide compounds or acids. The processing device 302 can also determine the amount of corrosion 322 based on additional received measurements, such as data from electrical or optical monitors detecting changes in the material properties of the pipeline 100. Additionally, the processing device 302 can determine the amount of corrosion 322 based on thermodynamic conditions (e.g., temperature and pressure) detected in the pipeline 100.

In some examples, the processing device 302 can determine a source 326 of a corrosive component detected in the spectroscopic measurements 316*a-b*. A first spectroscopic measurement 316*a* can be collected at a first sampling point of the pipeline 100, and the second spectroscopic measurement 316*b* can be collected at a second sampling point of the pipeline 100. The second sampling point can be downstream from the first sampling point. Material balance between the two sampling points may provide indication of flow assurance conditions. For example, the processing device 302 can monitor a component, such as trace water or other oxidizing agents. A drop in such a component at a downstream sampling point, such as the second sampling point, can indicate a source 326 of the corrosion.

Detection of an amount of a corrosive component 320 or an amount of corrosion 322 exceeding predetermined thresholds 324 or detection of a source 326 of corrosion can result in the processing device 302 determining an adjustment 328 to the process control 105. Such an adjustment 328 can be outputted to a pipeline tool 334, such as the waste handling system 130 of FIG. 1, causing the pipeline tool 334 to perform the adjustment 328. The type of adjustment 328 can vary based on the amount and nature of the corrosive components detected. Examples of the adjustment 328 can include alarms or warnings. In some examples, the adjustment 328 can include shutting down some or all components of the pipeline 100. Additionally, the adjustment 328 can involve initiating safety procedures, such as environmental protection systems like purging, flushing, spill control, or fire protection.

The adjustment 328 can also include chemical treatment. For example, the processing device 302 can determine, based on the spectroscopic measurements 316*a-b*, a type and amount of chemicals to inject into the pipeline 100 to remediate, inhibit, or dilute the effects of corrosive components. The adjustment 328 can also involve removing the corrosive component from the pipeline 100 if the source 326 has been identified. The processing device 302 can also determine an adjustment 328 of interlocking that can prevent the release of toxic or hazardous gases or fluids during setup, operation, maintenance, or decommissioning of the pipeline 100.

In some examples, the processing device 302 can use a predictive model 330 to make predictions 332 for corrosive components in the pipeline 100. The predictive model 330 may take the form of reactive modeling using thermodynamic, kinetic, or empirical relationships of reactants (e.g., alloys of the pipeline, chemical species in the pipeline, or matrix species of the pipeline not directly involved in the reaction but which may modify the reaction nature). The predictive model 330 may also involve physical modeling including (but not limited to) empirical modeling, equations of state such as cubic equations of state (e.g., Soave-Redlich-Kwong (SRK) or Peng Robinson), non-cubic equations of state such as perturbed chain statistical associating fluid theory (PCSAFT) or other statistical equations of state. The processing device 302 can update the predictive model 330 with spectroscopic measurements 316*a-b*. The predictive model 330 can then output predictions 332 based on the spectroscopic measurements 316*a-b*. If the predictions 332 involve amounts of corrosive components potentially exceeding predetermined thresholds in the future, the processing device 302 can preemptively determine and output adjustments 328 to prevent such conditions from occurring.

FIG. 4 is a flowchart of a process control 105 for a pipeline 100 using spectroscopy according to some examples of the present disclosure. While FIG. 4 depicts a certain sequence of steps for illustrative purposes, other examples can involve more steps, fewer steps, different steps, or a different order of steps depicted in FIG. 4. The process control 105 is described with reference to components shown in FIGS. 1-3.

At block 402, the processing device 302 can receive, from a spectroscopic monitoring system 318 coupled to a pipeline 100 for carbon capture, a spectroscopic measurement 316 with respect to fluid flow 106 in the pipeline 100. The spectroscopic monitoring system 318 can capture a representative sample 104 of fluid flow 106 in the pipeline 100 and can perform spectroscopic analysis on the representative sample 104. The processing device 302 can receive the spectroscopic measurements 316 for the representative sample 104 as electric signals from the spectroscopic monitoring system 318.

At block 404, the processing device 302 can determine, based on the spectroscopic measurement 316, that an amount of a corrosive component 320 in the fluid flow 106 exceeds a predetermined threshold 324 for the process control 105. For example, the processing device 302 can identify the presence of a corrosive component, as well as an amount of the corrosive component 320 from the spectroscopic measurement 316. Examples of corrosive components can include $H_2O$, $H_2S$, CO, $CH_4$, $N_2$, Ar, $H_2$, $CO_2$ or other agents that can corrode or cause cracking in the pipeline 100. The processing device 302 can then compare the amount of the corrosive component 320 to the predetermined threshold 324. The predetermined threshold 324 can be an acceptable level of corrosive component that can be present in the pipeline 100. Exceeding the predetermined threshold 324 can indicate that corrosion may be or is likely to take place in the pipeline 100. In some examples, the processing device 302 can additionally determine a source 326 of corrosion based on multiple spectroscopic measurements 316*a-b* taken at multiple sampling points in the pipeline 100.

At block 406, the processing device 302 can determine an adjustment 328 to the process control 105 for the fluid flow 106 usable to maintain a compositional stability of the fluid flow 106. Compositional stability can involve corrosive components remaining below their corresponding predetermined thresholds 324. The processing device 302 can determine the adjustment 328 based on the type and amount of corrosive components as well as the source 326 of the corrosive components. For example, the processing device 302 can determine that an adjustment 328 to the process control 105 can involve removing the corrosive component, diluting the corrosive component, adding an inhibitor for the corrosive component, shutting down the pipeline 100, or transmitting an alarm.

At block 408, the processing device 302 can output the adjustment 328 to a pipeline tool 334 to maintain the compositional stability of the fluid flow 106. Outputting the adjustment 328 can automatically control the pipeline tool 334 to perform the adjustment 328. For example, the pipeline tool 334 may perform adjustments 328 such as injecting chemicals into the pipeline 100 to dilute or inhibit the corrosive component. In another example, the pipeline tool 334 can divert or shut down the flow of the pipeline 100. Additionally, the processing device 302 may output an adjustment 328 to the spectroscopic monitoring system 318 to perform additional spectroscopic measurements 316.

In some aspects, a system, method, and computer-readable medium for monitoring a pipeline using spectroscopy are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a system comprising: a spectroscopic monitoring system coupled to a pipeline; a processing device; and a memory comprising instructions that are executable by the processing device for causing the processing device to implement a process control for fluid flow in the pipeline by: receiving, from the spectroscopic monitoring system, a spectroscopic measurement with respect to the fluid flow; determining, based on the spectroscopic measurement, that an amount of a corrosive component in the fluid flow exceeds a predetermined threshold for the process control; in response to determining that the corrosive component in the fluid flow exceeds the predetermined threshold, determining an adjustment to the process control for the fluid flow usable to maintain a compositional stability of the fluid flow; and outputting the adjustment to a pipeline tool to maintain the compositional stability of the fluid flow.

Example 2 is the system of example(s) 1, wherein the memory further comprises instructions that are executable by the processing device for causing the processing device to: update a predictive model for chemical components in the fluid flow using the spectroscopic measurement; determine that the corrosive component in the fluid flow is predicted to exceed the predetermined threshold for the process control using the predictive model; and determine the adjustment to the process control based on the prediction from the predictive model.

Example 3 is the system of example(s) 1-2, wherein the memory further comprises instructions that are executable by the processing device for causing the processing device to: determine, based on the spectroscopic measurement, an amount of corrosion in the pipeline that exceeds a predetermined threshold for the process control; and determine the adjustment to the process control based on the amount of corrosion.

Example 4 is the system of example(s) 1-3, wherein the corrosive component comprises at least one of $H_2O$, $H_2S$, CO, $CH_4$, $N_2$, Ar, $H_2$, or $CO_2$.

Example 5 is the system of example(s) 1-4, wherein the adjustment to the process control comprises removing the corrosive component, diluting the corrosive component, adding an inhibitor for the corrosive component, or shutting down the pipeline.

Example 6 is the system of example(s) 1-5, wherein the spectroscopic monitoring system is configured to perform a first spectroscopic measurement on a first representative sample of fluid flow collected at a first sampling point of the pipeline and a second spectroscopic measurement on a second representative sample of fluid flow collected at a second sampling point of the pipeline, the second sampling point being downstream from the first sampling point.

Example 7 is the system of example(s) 1-6, wherein the memory further comprises instructions that are executable by the processing device for causing the processing device to: determine, based on a difference between the first spectroscopic measurement and the second spectroscopic measurement, a source of the corrosive component; and determine the adjustment to the process control based on the source of the corrosive component.

Example 8 is a method: receiving, by a processing device from a spectroscopic monitoring system coupled to a pipeline, a spectroscopic measurement with respect to fluid flow in the pipeline; determining, by the processing device and based on the spectroscopic measurement, that an amount of a corrosive component in the fluid flow exceeds a predetermined threshold for a process control for the pipeline; in response to determining that the corrosive component in the fluid flow exceeds the predetermined threshold, determining, by the processing device, an adjustment to a process control for the fluid flow usable to maintain a compositional stability of the fluid flow; and outputting, by the processing device, the adjustment to a pipeline tool to maintain the compositional stability of the fluid flow.

Example 9 is the method of example(s) 8, further comprising: updating a predictive model for chemical components in the fluid flow using the spectroscopic measurement; determining that the corrosive component in the fluid flow is predicted to exceed the predetermined threshold for the process control using the predictive model; and determining the adjustment to the process control based on the prediction from the predictive model.

Example 10 is the method of example(s) 8-9, further comprising: determining, based on the spectroscopic measurement, an amount of corrosion in the pipeline that exceeds a predetermined threshold for the process control; and determining the adjustment to the process control based on the amount of corrosion.

Example 11 is the method of example(s) 8-10, wherein the corrosive component comprises at least one of $H_2O$, $H_2S$, CO, $CH_4$, $N_2$, Ar, $H_2$, or $CO_2$.

Example 12 is the method of example(s) 8-11, wherein the adjustment to the process control comprises removing the corrosive component, diluting the corrosive component, adding an inhibitor for the corrosive component, or shutting down the pipeline.

Example 13 is the method of example(s) 8-12, further comprising: measuring, by the spectroscopic monitoring system, a first spectroscopic measurement of a first representative sample of fluid flow collected at a first sampling point of the pipeline; and measuring, by the spectroscopic monitoring system, a second spectroscopic measurement of a second representative sample of fluid flow collected at a second sampling point of the pipeline, the second sampling point being downstream from the first sampling point.

Example 14 is the method of example(s) 8-13, further comprising: determining, based on a difference between the first spectroscopic measurement and the second spectroscopic measurement, a source of the corrosive component; and determining the adjustment to the process control based on the source of the corrosive component.

Example 15 is a non-transitory computer-readable medium comprising program code executable by a processing device for causing the processing device to implement a process control for fluid flow in a pipeline by: receiving, from a spectroscopic monitoring system coupled to the pipeline, a spectroscopic measurement with respect to the fluid flow; determining, based on the spectroscopic measurement, that an amount of a corrosive component in the fluid flow exceeds a predetermined threshold for the process control; in response to determining that the corrosive component in the fluid flow exceeds the predetermined threshold, determining an adjustment to the process control for the fluid flow usable to maintain a compositional stability of the fluid flow; and outputting the adjustment to a pipeline tool to maintain the compositional stability of the fluid flow.

Example 16 is the non-transitory computer-readable medium of example(s) 15, wherein the program code is further executable by the processing device for causing the processing device to: update a predictive model for chemical components in the fluid flow using the spectroscopic measurement; determine that the corrosive component in the fluid flow is predicted to exceed the predetermined threshold for the process control using the predictive model; and determine the adjustment to the process control based on the prediction from the predictive model.

Example 17 is the non-transitory computer-readable medium of example(s) 15-16, wherein the program code is further executable by the processing device for causing the processing device to: determine, based on the spectroscopic measurement, an amount of corrosion in the pipeline that exceeds a predetermined threshold for the process control; and determine the adjustment to the process control based on the amount of corrosion.

Example 18 is the non-transitory computer-readable medium of example(s) 15-17, wherein the corrosive component comprises at least one of $H_2O$, $H_2S$, CO, $CH_4$, $N_2$, Ar, $H_2$, or $CO_2$.

Example 19 is the non-transitory computer-readable medium of example(s) 15-18, wherein the adjustment to the process control comprises removing the corrosive component, diluting the corrosive component, adding an inhibitor for the corrosive component, or shutting down the pipeline.

Example 20 is the non-transitory computer-readable medium of example(s) 15-19, wherein the spectroscopic monitoring system is configured to perform a first spectroscopic measurement on a first representative sample of fluid flow collected at a first sampling point of the pipeline and a second spectroscopic measurement on a second representative sample of fluid flow collected at a second sampling point of the pipeline, the second sampling point being downstream from the first sampling point, and wherein the program code is further executable by the processing device for causing the processing device to: determine, based on a difference between the first spectroscopic measurement and the second spectroscopic measurement, a source of the corrosive component; and determine the adjustment to the process control based on the source of the corrosive component.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:

a spectroscopic monitoring system coupled to a pipeline;

a processing device; and a memory comprising instructions that are executable by the processing device for causing the processing device to implement a process control for fluid flow in the pipeline by:

receiving, from the spectroscopic monitoring system, a spectroscopic measurement with respect to the fluid flow;

determining, based on the spectroscopic measurement, that an amount of a corrosive component in the fluid flow exceeds a predetermined threshold for the process control;

in response to determining that the corrosive component in the fluid flow exceeds the predetermined threshold, determining an adjustment to the process control for the fluid flow usable to maintain a compositional stability of the fluid flow; and outputting the adjustment to a pipeline tool to maintain the compositional stability of the fluid flow.

2. The system of claim 1, wherein the memory further comprises instructions that are executable by the processing device for causing the processing device to:

update a predictive model for chemical components in the fluid flow using the spectroscopic measurement;

determine that the corrosive component in the fluid flow is predicted to exceed the predetermined threshold for the process control using the predictive model; and determine the adjustment to the process control based on a prediction from the predictive model.

3. The system of claim 1, wherein the memory further comprises instructions that are executable by the processing device for causing the processing device to:

determine, based on the spectroscopic measurement, an amount of corrosion in the pipeline that exceeds a predetermined threshold for the process control; and determine the adjustment to the process control based on the amount of corrosion.

4. The system of claim 1, wherein the corrosive component comprises at least one of $H_2O$, $H_2S$, CO, $CH_4$, $N_2$, Ar, $H_2$, or $CO_2$.

5. The system of claim 1, wherein the adjustment to the process control comprises removing the corrosive component, diluting the corrosive component, adding an inhibitor for the corrosive component, or shutting down the pipeline.

6. The system of claim 1, wherein the spectroscopic monitoring system is configured to perform a first spectroscopic measurement on a first representative sample of fluid flow collected at a first sampling point of the pipeline and a second spectroscopic measurement on a second representative sample of fluid flow collected at a second sampling point of the pipeline, the second sampling point being downstream from the first sampling point.

7. The system of claim 6, wherein the memory further comprises instructions that are executable by the processing device for causing the processing device to:

determine, based on a difference between the first spectroscopic measurement and the second spectroscopic measurement, a source of the corrosive component; and determine the adjustment to the process control based on the source of the corrosive component.

8. A method comprising:

receiving, by a processing device from a spectroscopic monitoring system coupled to a pipeline, a spectroscopic measurement with respect to fluid flow in the pipeline;

determining, by the processing device and based on the spectroscopic measurement, that an amount of a corrosive component in the fluid flow exceeds a predetermined threshold for a process control for the fluid flow in the pipeline;

in response to determining that the corrosive component in the fluid flow exceeds the predetermined threshold, determining, by the processing device, an adjustment to the process control for the fluid flow usable to maintain a compositional stability of the fluid flow; and outputting, by the processing device, the adjustment to a pipeline tool to maintain the compositional stability of the fluid flow.

9. The method of claim 8, further comprising:

updating a predictive model for chemical components in the fluid flow using the spectroscopic measurement;

determining that the corrosive component in the fluid flow is predicted to exceed the predetermined threshold for the process control using the predictive model; and determining the adjustment to the process control based on a prediction from the predictive model.

10. The method of claim 8, further comprising:

determining, based on the spectroscopic measurement, an amount of corrosion in the pipeline that exceeds a predetermined threshold for the process control; and determining the adjustment to the process control based on the amount of corrosion.

11. The method of claim 8, wherein the corrosive component comprises at least one of $H_2O$, $H_2S$, CO, $CH_4$, $N_2$, Ar, $H_2$, or $CO_2$.

12. The method of claim 8, wherein the adjustment to the process control comprises removing the corrosive component, diluting the corrosive component, adding an inhibitor for the corrosive component, or shutting down the pipeline.

13. The method of claim 8, further comprising:

measuring, by the spectroscopic monitoring system, a first spectroscopic measurement of a first representative sample of fluid flow collected at a first sampling point of the pipeline; and measuring, by the spectroscopic monitoring system, a second spectroscopic measurement of a second representative sample of fluid flow collected at a second sampling point of the pipeline, the second sampling point being downstream from the first sampling point.

14. The method of claim 13, further comprising:

determining, based on a difference between the first spectroscopic measurement and the second spectroscopic measurement, a source of the corrosive component; and determining the adjustment to the process control based on the source of the corrosive component.

15. A non-transitory computer-readable medium comprising program code executable by a processing device for causing the processing device to implement a process control for fluid flow in a pipeline by:

receiving, from a spectroscopic monitoring system coupled to the pipeline, a spectroscopic measurement with respect to the fluid flow;

determining, based on the spectroscopic measurement, that an amount of a corrosive component in the fluid flow exceeds a predetermined threshold for the process control;

in response to determining that the corrosive component in the fluid flow exceeds the predetermined threshold, determining an adjustment to the process control for the fluid flow usable to maintain a compositional stability of the fluid flow; and outputting the adjustment to a pipeline tool to maintain the compositional stability of the fluid flow.

16. The non-transitory computer-readable medium of claim 15, wherein the program code is further executable by the processing device for causing the processing device to:

update a predictive model for chemical components in the fluid flow using the spectroscopic measurement;

determine that the corrosive component in the fluid flow is predicted to exceed the predetermined threshold for the process control using the predictive model; and determine the adjustment to the process control based on a prediction from the predictive model.

17. The non-transitory computer-readable medium of claim 15, wherein the program code is further executable by the processing device for causing the processing device to:

determine, based on the spectroscopic measurement, an amount of corrosion in the pipeline that exceeds a predetermined threshold for the process control; and determine the adjustment to the process control based on the amount of corrosion.

18. The non-transitory computer-readable medium of claim 15, wherein the corrosive component comprises at least one of $H_2O$, $H_2S$, CO, $CH_4$, $N_2$, Ar, $H_2$, or $CO_2$.

19. The non-transitory computer-readable medium of claim 15, wherein the adjustment to the process control comprises removing the corrosive component, diluting the corrosive component, adding an inhibitor for the corrosive component, or shutting down the pipeline.

20. The non-transitory computer-readable medium of claim 15, wherein the spectroscopic monitoring system is configured to perform a first spectroscopic measurement on a first representative sample of fluid flow collected at a first sampling point of the pipeline and a second spectroscopic measurement on a second representative sample of fluid flow collected at a second sampling point of the pipeline, the second sampling point being downstream from the first sampling point, and wherein the program code is further executable by the processing device for causing the processing device to:

determine, based on a difference between the first spectroscopic measurement and the second spectroscopic measurement, a source of the corrosive component; and determine the adjustment to the process control based on the source of the corrosive component.

* * * * *